March 29, 1949  C. E. TACK  2,465,823
ROTOR BRAKE

Filed Feb. 16, 1945  3 Sheets-Sheet 1

INVENTOR.
Carl E. Tack
BY
Atty.

March 29, 1949. C. E. TACK 2,465,823
ROTOR BRAKE
Filed Feb. 16, 1945 3 Sheets-Sheet 2

INVENTOR.
Carl E. Tack
BY
Ann O. Garner
Atty.

March 29, 1949.    C. E. TACK    2,465,823
ROTOR BRAKE

Filed Feb. 16, 1945    3 Sheets-Sheet 3

INVENTOR.
Carl E. Tack
BY
Atty.

Patented Mar. 29, 1949

2,465,823

UNITED STATES PATENT OFFICE 2,465,823

ROTOR BRAKE

Carl E. Tack, Chicago, Ill., assignor to American Steel Foundries, Chicago, Ill., a corporation of New Jersey Application February 16, 1945, Serial No. 578,234

20 Claims. (Cl. 188—59)

My invention relates to railway car trucks and more particularly to a brake arrangement for four wheel trucks of freight car type.

An object of my invention is to devise a brake arrangement for a truck of the type described wherein clasp brake means is supported from the spaced side frames for engagement with rotor discs carried on the supporting wheel and axle assemblies.

Another object of my invention is to devise a brake arrangement such as above described for a freight car truck which will satisfactorily comply with existing manufacturing standard requirements, such as clearance conditions, standards of strength, and the like.

A more specific object of my invention is to devise such a brake utilizing an independent brake frame associated with each wheel and axle assembly and supported from the side frames of the truck.

My invention contemplates side frames of novel form each comprising a pocket at opposite sides of the bolster opening for receiving the adjacent ends of the associated brake frames and affording support therefor, said pockets comprising resilient clamping means for maintaining said brake frames in assembled relationship with the associated side frames.

My invention comprehends the formation of a wheel and rotor as an integral unit wherein the rotor comprises a brake ring having a steel support of disclike form with the inner perimeter thereof embedded in an iron wheel.

Figure 1:
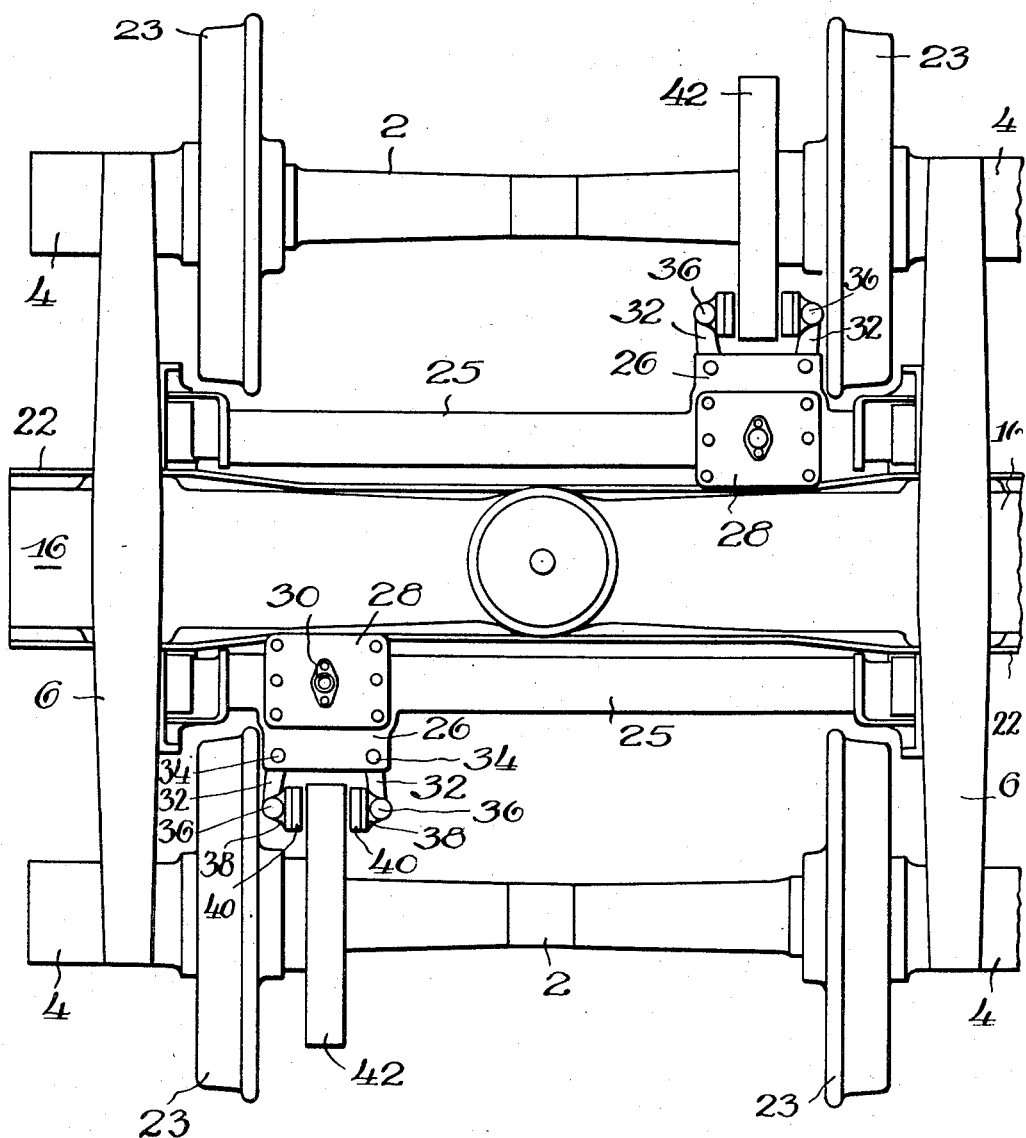
Figure 1 is a top plan view of a freight car truck embodying my invention.

Describing the structure in detail, and referring first to the general arrangement thereof illustrated in Figure 1, there is shown a four wheel freight car truck of quick wheel change type comprising the wheel and axle assemblies generally indicated at 2, 2 and through the journal connections at 4, 4 affording support for the spaced side frames 6, 6, each side frame (Figures 3 and 5) comprising a compression member 8, a tension member 10 and bolster guide columns 12, 12 merging therewith to define the spaced window openings 13, 13 and the central bolster opening 14. The bolster opening 14 in each side frame receives the adjacent end of the bolster 16 of a type in common usage and having the usual inboard and outboard guide lugs 18 and 20 on each side thereof in engagement with the adjacent columns 12, said bolster end being supported on springs 21 seated on the spring plank 22 in engagement with the tension member 10. As may be noted from a consideration of Figure 3, the bolster opening 14 in each side frame 6 is provided with a widened lower portion 24 of sufficient depth and width to permit the bolster to be removed therefrom, after removal of the springs 21 and spring plank 22, for quick wheel change purposes.

A brake frame or beam 25 is supported from the side frames 6, 6 adjacent each wheel and axle assembly 2, as hereinafter more fully described, said beam being identical with that shown and described in my copending application, Serial No. 512,110, now U. S. Patent 2,433,582, December 30, 1947, and comprising a tubelike member having adjacent an end thereof a cylinder housing 26 having a cover plate 28 provided with a fitting 30 affording convenient connection to a fluid supply line (not shown), said supply line conveying actuating fluid to a cylinder 31 within the housing 26 and operatively associated in usual manner with the brake levers 32, 32 fulcrumed within the housing 28 as at 34, 34. The levers are pivoted as at 36, 36 to brake heads 38, 38 carrying brake shoes 40, 40 for engagement with opposite sides of the adjacent brake disc or rotor 42, said levers having release means associated therewith comprising a tension spring 43 having opposite ends thereof connected to the levers and operative to release the levers and thereby the shoes 40, 40 associated therewith from the braking surfaces of the rotor 42.

Referring now to Figure 1, it may be noted that each wheel and axle assembly 2, 2 is provided with a single rotor 42, the rotors being connected to wheels at diagonally opposite corners of the truck and adapted to be engaged by the above-described brake means associated with the adjacent brake beam 25, said arrangement permitting the braking forces to be distributed equally between the side frames 6, 6 in a truck of the type described while insuring sufficient braking capacity to meet the demands necessary in operation.

Figure 6:
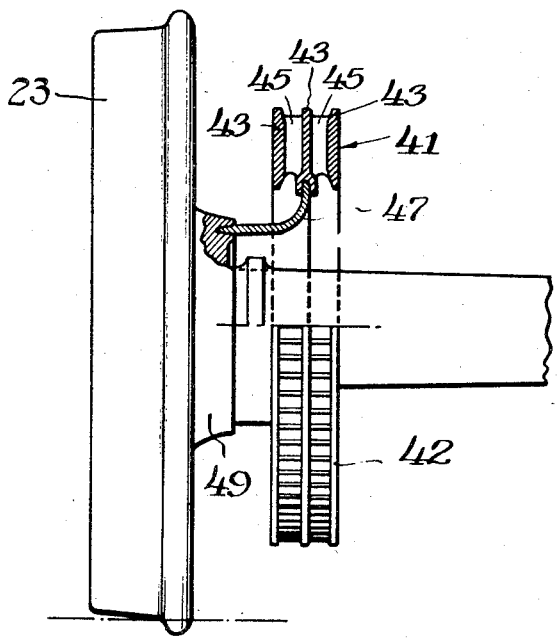
Figure 6 is a fragmentary side elevation of one of the wheel and axle assemblies with the wheel and associated rotor shown partly in radial section to illustrate the connection therebetween.

Each rotor 42 is of the type shown and described in my Patent No. 2,350,970 and, as may best be seen in Figure 6, is an integral casting comprising the brake ring 41 formed by three spaced annular plates 43 with radially arranged blades 45 extending therebetween, the central plate being connected at the inner perimeter thereof to a disclike support member 47 having the inner perimeter thereof embedded in the hub 49 of the adjacent wheel 23. The wheel 23 and rotor 42 may be readily formed as an integral unit in casting the same by inserting the inner perimeter of the member 47, which may be of steel, into the mold utilized for casting the iron wheel and, subsequently, after pouring and chilling the iron in the wheel mold, casting the cast iron brake ring 41 about the outer perimeter of the member 47. The rotor is thus made an integral portion of the wheel and substantial savings are effected in manufacturing costs by dispensing with the conventional practice of forming the rotor and wheel as separate units and thereafter specially machining the same and providing bolting means of attachment for the assembly of the wheel and rotor.

Figure 2:
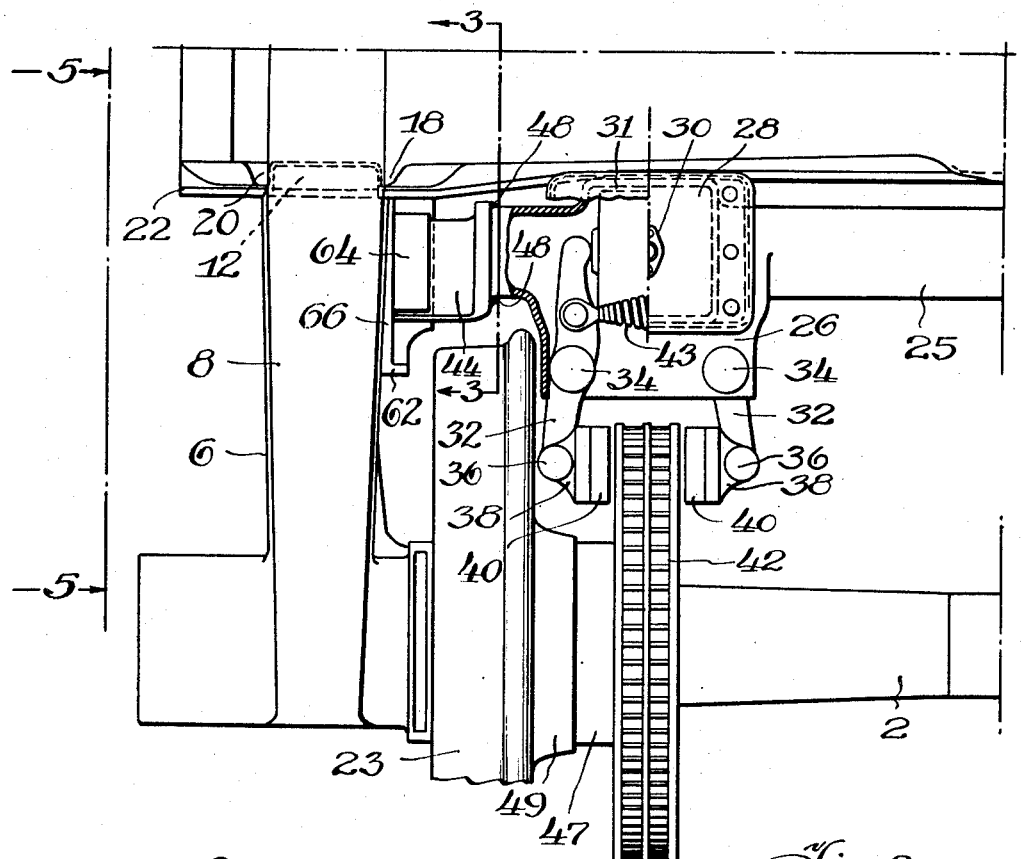
Figure 2 is an enlarged fragmentary view of the truck structure shown in Figure 1 illustrating my novel brake arrangement in more detail.
Figure 3:
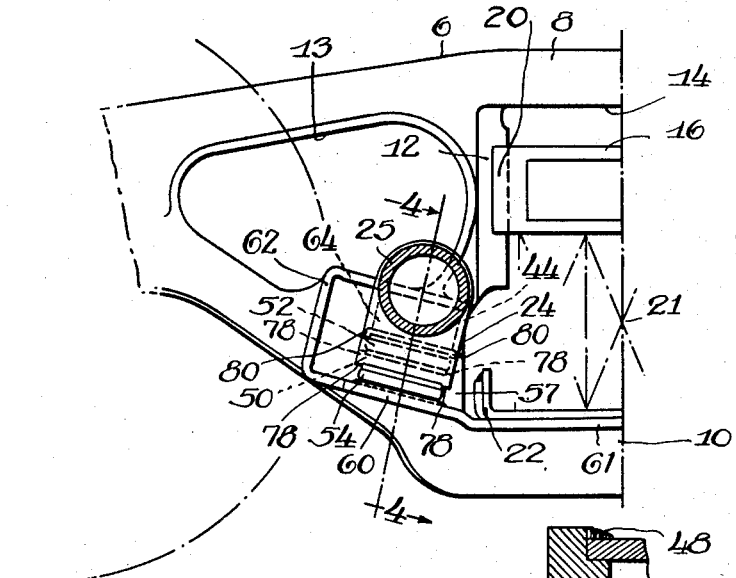
Figure 3 is a fragmentary sectional view of the structure shown in Figure 2, the section being taken in the plane indicated by the line 3—3 of Figure 2.
Figure 4:
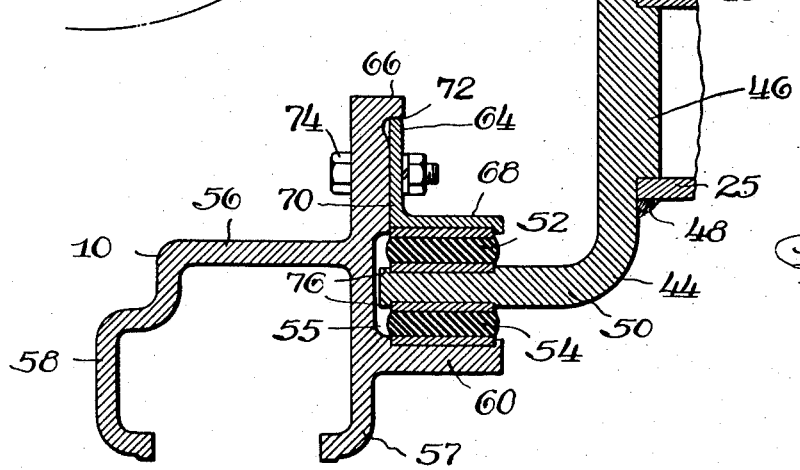
Figure 4 is a sectional view taken in the plane indicated by the line 4—4 of Figure 3.

Referring now to Figures 2 to 4, each end of the beam 25 is provided with a platelike member 44 of J section having an annular boss 46 fitted within the opening in the adjacent end of the beam and which may be secured thereto by welding as at 48, 48. The horizontal leg 50 of each member 44 is compressed between top and bottom resilient members 52 and 54 mounted in the pocket 55 in the adjacent side frame 6 as will now be described.

Figure 5:
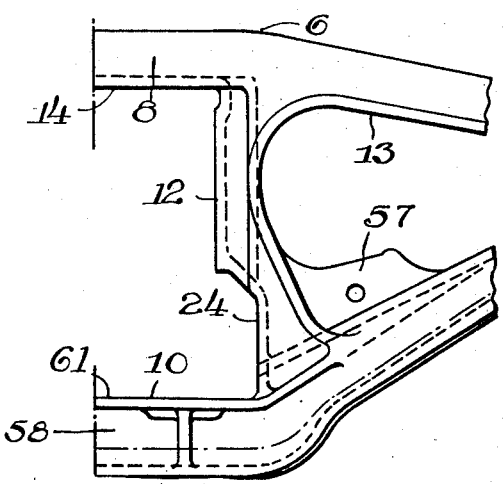
Figure 5 is a fragmentary side elevation of one of the side frames taken in the plane indicated by the line 5—5 of Figure 2 and looking in the direction of the arrows.

As may be noted from a consideration of Figures 3 to 5, the tension member 10 of each side frame merges at opposite sides of the bolster opening 14 with a column 12 and comprises the top chord 56 merging with the spaced inboard and outboard walls 57 and 58, said inboard wall 57 projecting above the top chord 56 into the adjacent window opening 13 and merging at one end thereof into the column 12. Extending laterally of the inboard wall 57 toward the adjacent end of the brake beam 25 is the diagonal shelflike support or web 60 which may form a continuation of a flange 61 integral with the top chord 56 and extending inboard and outboard said top chord in said bolster opening 14 for supporting with the top chord the associated end of the spring plank 22, as clearly shown in Figure 3, said inboard wall 57 and web 60 merging with an end wall 62.

Supported on the web 60 between the associated resilient members 52 and 54 is the leg 50 of the member 44. Each resilient member 52 and 54 is a composite member comprising a resilient pad with top and bottom liners secured thereto as by vulcanizing. The resilient members compress the leg 50 therebetween by means of a clamping piece 64 of L section urged into engagement with the member 52 by positioning the upper edge thereof in engagement with an inturned flange 66 on the inboard wall 50 and parallel with the web 60 and urging the horizontal portion or leg 68 of the clamping piece 64 downwardly until it has full face engagement with the member 52 and the vertical portion or leg 70 of said piece engages the wall 57, said flange 66 thus affording a fulcrum point as at 72 for said piece 64 and maintaining the piece 64 in assembly with the associated wall 57 and pad 52. To insure the legs 68 and 70 of the clamping piece 64 being maintained in said engagement during operation of the truck, a bolt and nut assembly 74 may be utilized as shown in Figure 4.

Referring now to Figures 3 and 4, the leg 50 of the member 44 is provided with top and bottom end flanges 76, 76 and top and bottom lateral flanges 78, 78 cooperating with the resilient members 52 and 54 whereby relative movement between the beam 25 and the side frame 6 laterally or longitudinally of the truck is resisted in shear by the members 52 and 54. To maintain the leg 50 of the member 44 in a predetermined position on the web 60 within the pocket 55 defined by said web 60, the end wall 62 and the leg 68 of the clamping piece 64, the leg 68 of the clamping piece 64 is provided at opposite ends thereof with the integral downwardly projecting flanges 80, 80 in abutment with the sides of the resilient member 52 as shown in Figure 3.

Thus it will be seen that I have devised a novel brake arrangement in which each brake frame or beam is afforded a two-point resilient support from the side frames of a railway truck of freight car type, said two-point support being the sole torque transmitting means and support means for the beam with respect to the truck. As will be understood from a consideration of Figures 3 and 4, the beam 25 and its associated braking mechanism may be removed from the truck by removing the clamping pieces 64, 64 and then disassembling the truck, as contemplated in the ordinary manner for quick wheel change purposes, by removing the spring plank 22 and the bolster-supporting springs 21, as well as the bolster 16, through the widened lower portion 24 of the bolster opening 14 whereupon the side frames 6 may be moved apart for dropping the brake frame 25.

It will be noted that although the supports for the brake beam are shown as located at the juncture between each column and the tension member of the frame, these supports, as will be readily understood by those skilled in the art, may be formed elsewhere on the frames, as, for example, at the juncture between each column and the compression member or on the column members or other locations, and that these modifications come within the purview of this invention.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a truck structure comprising spaced wheel and axle assemblies, a brake disc on each assembly, a pair of side frames supported on said assemblies and each comprising tension and compression members merging with spaced columns and defining a bolster opening therewith, a bolster spring-supported on said tension members in said openings, a pocket on the inboard side of one of the members of each side frame and at opposite sides of said bolster, brake beams extending between said frames adjacent respective assemblies, each of said beams comprising end portions within respective pockets, vertically spaced resilient pads within each pocket clamping the associated end portion therebetween, and brake shoes carried by said beams for engagement with said discs.

2. In a brake arrangement for a railway car truck, a truck structure comprising spaced wheel and axle assemblies, a brake disc on each assembly, a pair of side frames supported on said assemblies and each comprising tension and compression members merging with spaced columns and defining a bolster opening therewith, a bolster spring-supported on said tension members in said openings, spaced pockets on the inboard side of each side frame at opposite sides of the bolster opening therein, brake beams extending between said frames adjacent respective assemblies, resilient members in said pockets clamping the adjacent ends of said beams and yieldingly resisting lateral movement of said beams, and friction means carried by said beams for engagement with said discs.

3. A side frame for a railway car truck comprising tension and compression members and spaced columns merging therewith to define spaced window openings and a central bolster opening, said tension member being of box section comprising a top chord and spaced inboard and outboard walls merging therewith, a vertical web forming a continuation of said inboard wall, a diagonal web extending outwardly of said inboard wall and adapted to support an associated brake beam, a flange on said vertical web parallel with said diagonal web, an L-shaped member in abutment with said vertical web and said flange, and vertically spaced resilient means mounted respectively on said diagonal web and the horizontal leg of said member.

4. In a brake arrangement for a railway car truck, a truck structure comprising spaced wheel and axle assemblies, a brake disc on each assembly, a pair of side frames supported on said assemblies and each comprising tension and compression members merging with spaced columns and defining a bolster opening therewith, a bolster spring-supported on said tension members in said openings, spaced pockets on the inboard side of each side frame at opposite sides of the bolster opening therein, brake means extending between said frames adjacent respective assemblies and resiliently mounted in said pockets, and friction means carried by said means for engagement with said discs.

5. In a railway brake arrangement for a railway car truck, a truck structure comprising a wheel and axle assembly, spaced truss type side frame members supported thereon and each having a bolster opening, a bolster resiliently supported in said bolster openings, a brake beam member extending between said side frame members, a resilient connection between each side frame member and said brake beam member comprising a jaw in one of said members receiving a portion of the other member, resilient means within said jaw clamping said portion, and friction means carried by said beam member for engagement with rotatable means on said assembly.

6. In a brake arrangement for a railway car truck, a truck structure comprising spaced wheel and axle assemblies, a brake disc on each assembly, a pair of side frames supported on said assemblies and each comprising tension and compression members merging with spaced columns and defining a bolster opening therewith, a bolster supported on said tension members in said openings, pockets on the tension member of each side frame at opposite sides of the bolster opening therein, a brake frame adjacent each assembly and said bolster and having opposite ends thereof supported in respective pockets, and friction means on said brake frames for engagement with said brake discs.

7. In a brake arrangement for a railway car truck, a truck structure comprising spaced wheel and axle assemblies, a brake disc on each assembly, a pair of side frames supported on said assemblies and each comprising tension and compression members and spaced columns defining a bolster opening therewith, a bolster resiliently supported on said frames in said openings, brake beams at opposite sides of said bolster and adjacent respective assemblies, jaw means on the inboard sides of similar members of said side frames resiliently clamping the adjacent ends of said beams and affording a tight connection between said beams and said side frames, and brake shoes carried by said beams for engagement with said discs.

8. In a brake arrangement for a railway car truck, a truck structure comprising spaced wheel and axle assemblies, a brake disc on each assembly, a pair of side frames supported on said assemblies and each comprising tension and compression members and spaced columns defining a bolster opening therewith, a bolster resiliently supported on said frames in said openings, brake beams at opposite sides of said bolster and adjacent respective assemblies, jaw means on the inboard side of each of said tension members resiliently clamping the adjacent ends of said beams, and brake shoes carried by said beams for engagement with said discs.

9. In a brake arrangement for a railway car truck, a truck structure comprising spaced wheel and axle assemblies, a brake disc on each assembly, a pair of side frames supported on said assemblies and each comprising tension and compression members and spaced columns defining a bolster opening therewith, a bolster resiliently supported on said frames in said openings, brake beams at opposite sides of said bolster and adjacent respective assemblies, each of said beams having a torque arm at each end thereof, a jaw-like structure on one of the members of each side frame adjacent each torque arm and receiving a portion of the same therein, resilient means within each structure clamping said portion of the associated torque arm therebetween, and friction means carried by said beams for engagement with said discs.

10. In a brake arrangement for a railway car truck, a truck structure comprising spaced wheel and axle assemblies, a pair of side frames supported thereon, a bolster extending between said frames and spring-supported thereon, a brake disc mounted on each assembly, a brake beam extending transversely of said truck adjacent each assembly, a two-point support for each beam comprising a connection between each end thereof and means on said side frames, said means comprising resilient means resisting lateral and longitudinal movement of said beam in shear, and brake shoes carried by said beams for engagement with said discs.

11. In a brake arrangement for a railway car truck, a truck structure comprising spaced side frames and an interposed bolster spring-supported therefrom, supporting wheel and axle assemblies, a brake beam extending transversely of said truck adjacent each assembly and entirely spaced therefrom, means on the inboard side of each side frame resiliently supporting the adjacent end of said beam, said means comprising top and bottom resilient means bearing against substantially rectangular abutments on said ends, and brake shoes carried by said beams for engagement with rotatable means on said assemblies.

12. In a brake arrangement for a railway car truck, a truck structure comprising spaced wheel and axle assemblies, a brake disc on each assembly, a pair of side frames supported on said assemblies and each comprising tension and compression members merging with spaced columns and defining a bolster opening therewith, a bolster supported on said tension members in said openings, a brake frame extending between said side frames adjacent each assembly, means on similar members of said side frames supporting the adjacent ends of said brake frames, resilient means mounted in each of said last-mentioned means and clamping said ends of said brake frames therebetween for yieldingly accommodating limited lateral, longitudinal and torsional movement of said brake frames with respect to said side frames, and friction means on said brake frames for engagement with said brake discs.

13. In a brake arrangement for a railway car truck, a truck structure comprising spaced wheel and axle assemblies, a brake disc on each assembly, a pair of side frames supported on said assemblies and each comprising tension and compression members merging with spaced columns defining a bolster opening, a bolster supported on said tension members in said openings, a brake frame extending between said side frames adjacent each assembly, means on similar members of said side frames resiliently mounting the adjacent ends of said brake frames, said means comprising a laterally extending web on said last-named members underlying said ends of said beams, a removable piece above each web and having a portion overlying the end of the associated beam, resilient means between each beam end and the associated web and piece, and friction means on said brake frames for engagement with said brake discs.

14. In a brake arrangement for a railway car truck, a truck structure comprising spaced wheel and axle assemblies, a pair of side frames supported thereon, a bolster spring-supported on said frames, a brake beam between each axle assembly and said bolster and extending substantially parallel thereto, means on each side frame at opposite sides of said bolster affording a torque connection for the adjacent ends of said beams, said means comprising jaws with resilient blocks therein clamping said beam ends therebetween, and clasp brake means carried by said beams for engagement with opposite sides of rotatable means on said assemblies.

15. In a brake arrangement for a railway car truck, a truck structure comprising spaced wheel and axle assemblies, a pair of side frames supported thereon, a bolster extending between said frames and spring-supported thereon, a support integral with the inboard side of each frame at each side of said bolster, brake beams adjacent respective assemblies and having opposite ends thereof mounted on said supports, means for resiliently clamping the ends of said beams to said supports, and friction means carried by said beams for engagement with rotatable means on said assemblies.

16. A side frame for a railway car truck comprising tension and compression members and spaced columns merging therewith to define spaced window openings and a central bolster opening, and a pocket on one side of said tension member at each side of said bolster opening and adapted for reception of an associated brake beam, each of said pockets comprising resilient clamping means for the associated brake beam.

17. In a brake arrangement for a railway car truck, spaced side frames and an interposed bolster resiliently supported therefrom, spaced supporting wheel and axle assemblies, brake beams extending transversely of said truck, brackets on said side frames affording support for said beams, resilient pads within said brackets for clamping said beams thereto, and friction means carried by said beams for engagement with rotatable means on said assemblies.

18. A side frame for a railway car truck comprising tension and compression members and spaced columns merging therewith to define spaced window openings and a central bolster opening, and a pocket in one of said members at each side of said bolster opening and adapted for reception of an associated brake beam, each of said pockets comprising resilient clamping means for the associated brake beam.

19. A side frame for a railway car truck comprising tension and compression members and spaced columns merging therewith to define a central bolster opening and spaced window openings, a jawlike structure on one of said members at opposite sides of said bolster opening and adapted for reception of an associated brake beam, each of said structures carrying resilient clamping means for the associated brake beam.

20. In a brake arrangement for a railway car truck; spaced side frames each comprising tension and compression members and spaced columns merging therewith to define a bolster opening; a bolster resiliently supported in said bolster openings; spaced supporting wheel and axle assemblies; each of said tension members comprising an inboard wall, a vertical web forming a continuation of said inboard wall, a diagonal web extending outwardly of said wall, and a flange on said vertical web parallel to said diagonal web; an L-shaped member associated with each tension member in abutment with said vertical web and said flange thereon; brake beams between said side frames; and vertically spaced resilient means mounted respectively on each of said diagonal webs and the horizontal leg of each of said L-shaped members and embracing an end of the adjacent beam therebetween.

CARL E. TACK.

REFERENCES CITED

The following references are of record in the file of this patent:

UNITED STATES PATENTS

| Number | Name | Date |
|---|---|---|
| 546,609 | Dearing | Sept. 17, 1865 |
| 863,420 | McKenna | Aug. 13, 1907 |
| 970,378 | Lindstrom | Sept. 13, 1910 |
| 2,136,447 | Le Jeune | Nov. 15, 1938 |
| 2,170,112 | Busch | Aug. 22, 1939 |
| 2,253,268 | Eksergian et al. | Aug. 19, 1941 |
| 2,274,859 | Eksergian | Mar. 3, 1942 |
| 2,274,860 | Gaenssle | Mar. 3, 1942 |
| 2,334,024 | Nystrom et al. | Nov. 9, 1943 |
| 2,345,016 | Tack | Mar. 28, 1944 |
| 2,365,460 | Eksergian | Dec. 19, 1944 |
| 2,399,071 | Tack | Apr. 28, 1946 |